United States Patent [19]
Chang

[11] Patent Number: 5,686,225
[45] Date of Patent: Nov. 11, 1997

[54] METHOD OF MANUFACTURING A MULTILAYER INFORMATION DISC

[75] Inventor: Kwang-hyuk Chang, Suwon, Rep. of Korea

[73] Assignee: Samsung Electronics Co., Ltd., Kyungki-Do, Rep. of Korea

[21] Appl. No.: 682,891

[22] Filed: Jul. 12, 1996

Related U.S. Application Data

[62] Division of Ser. No. 556,083, Nov. 9, 1995, abandoned.

[30] Foreign Application Priority Data

Nov. 9, 1994 [KR] Rep. of Korea .............. 94-29265

[51] Int. Cl.⁶ .................................. G11B 7/26
[52] U.S. Cl. ............... 430/321; 430/945; 264/2.5; 264/106
[58] Field of Search ............... 369/275.3, 275.4, 369/277, 279; 430/321, 945; 264/2.5, 106

[56] References Cited

U.S. PATENT DOCUMENTS

| | | | |
|---|---|---|---|
| 5,004,660 | 4/1991 | Van Andel et al. | 430/945 |
| 5,373,499 | 12/1994 | Imaino et al. | 369/275 |
| 5,418,774 | 5/1995 | O'Hara et al. | 369/275 |
| 5,485,452 | 1/1996 | Maeda | 369/275 |
| 5,494,782 | 2/1996 | Maenza et al. | 430/321 |
| 5,499,231 | 3/1996 | Fennema et al. | 369/275 |
| 5,513,170 | 4/1996 | Best et al. | 369/275 |

FOREIGN PATENT DOCUMENTS

| | | | |
|---|---|---|---|
| 59-107433 | 6/1984 | Japan | 369/281 |
| 62-180540 | 8/1987 | Japan . | |

*Primary Examiner*—John A. McPherson
*Attorney, Agent, or Firm*—Sughrue, Mion, Zinn, Macpeak & Seas, PLLC

[57] ABSTRACT

A multilayer information disc formed by joining a plurality of disc units and a manufacturing method thereof are provided. The plurality of disc units contain information tracks which have the same spiral directions relative to an optical pickup device when the plurality of the disc units are joined. As a result, information recorded on all of the disc units can be reproduced by rotating the multilayer information disc in a single direction. Consequently, the structure and cost of the recording/reproducing apparatus which reproduces the information is reduced.

5 Claims, 4 Drawing Sheets

1

METHOD OF MANUFACTURING A MULTILAYER INFORMATION DISC

This is a divisional of application Ser. No. 08/556,083 filed Nov. 9, 1995, now abandoned.

FIELD OF THE INVENTION

The present invention relates to a multilayer information disc formed by layering a plurality of disc units upon each other and relates to a method for manufacturing the multilayer information disc. More particularly, the invention relates to a multilayer information disc, which can be reproduced by a disc player having a relatively simple configuration, and a manufacturing method thereof.

BACKGROUND OF THE INVENTION

One example of a conventional multilayer information disc is shown in FIGS. 1 and 2. In particular, FIG. 1 is a perspective view schematically showing two separated disc units which form the multilayer information disc, and FIG. 2 is a cross-sectional view of the two disc units joined together.

As illustrated in the figures, a multilayer information disc 9 is made of two disc units 1 and 2 which are joined together via a juncture member 3. The disc units 1 and 2 respectively have recording surfaces 11 and 21 on which information tracks 12 and 22 are formed. Specifically, the information tracks 12 and 22 respectively contain a plurality of pits 13 and 23 having predetermined depths within the surfaces 11 and 21 of the disc units 1 and 2.

Furthermore, the information tracks 12 and 22 are spirally arranged in the same direction on each surface 11 and 12 of the disc units 1 and 2 as shown in FIG. 1. In particular, the spiral directions of each of the information tracks 12 and 22 travel in a counterclockwise direction as one moves from the edge to the center of each disc unit 1 and 2.

By selectively varying the length and position of the pits 13 and 23, information can be recorded in the tracks 12 and 22 of each disc unit 1 and 2. Consequently, when the disc units 1 and 2 are joined together to form a multilayer information disc 9, the information contained in the disc 9 can be reproduced via an optical pickup device 4 of a disc player (not shown). As is commonly known, the information is reproduced by loading the multilayer information disc 9 in the disc player, rotating the disc 9 in a predetermined direction, and moving the optical pickup device 4 between the center and edge of disc 9. In other words, by performing the operation above, the optical pickup device 4 reads the recorded information by following the spiral information tracks 12 and 22.

In the conventional multilayer information disc 9, the spiral directions of the information tracks 12 and 22 formed on the individual disc units 1 and 2 are the same. However, when the disc units 1 and 2 are joined together to form the multilayer information disc 9, the surfaces 11 and 21 respectively containing the spiral information tracks 12 and 22 are positioned to face each other. As a result, the spiral directions of the information track 12 of upper disc unit 1 and the information track 22 of lower disc unit 2 become opposite to each other.

Consequently, in order to reproduce the information contained in the upper disc unit 1 of the multilayer information disc 9, the disc 9 must be rotated in one direction (e.g. counterclockwise). In contrast, in order to reproduce the information contained in the lower disc unit 2, the disc 9 must be rotated in a different direction (e.g. clockwise). Accordingly, since the disc player must rotate the multilayer information disc 9 in two separate directions to reproduce the information stored in each disc unit 1 and 2, the configuration of the disc player is relatively complicated. Consequently, the time and cost to manufacture the disc player is relatively high.

SUMMARY OF THE INVENTION

To solve the above problems, it is an object of the present invention to provide a multilayer information disc which is capable of being reproduced by a disc player having a simple structure.

It is another object of the present invention to provide a method of manufacturing the above multilayer information disc.

In order to achieve the first object, there is provided a multilayer information disc comprising: a first disc unit having a first recording surface, wherein the first recording surface comprises a first spiral information track; and a second disc unit having a second recording surface, wherein the second recording surface comprises a second spiral information track, wherein the second disc unit is joined with the first disc unit such that the first recording surface faces the second recording surface, and wherein a first spiral direction of the first spiral information track is the same as a second spiral direction of the second information track.

In order to achieve the second object, there is provided a manufacturing method of a multilayer information disc, comprising the steps of: manufacturing a first disc unit having a first surface on which a first spiral information track is formed, wherein first information is recorded in the first spiral information track; manufacturing a second disc unit having a second surface on which a second spiral information track is formed, wherein second information is recorded in the second spiral information track and wherein a first spiral direction of the first spiral information track is opposite to a second spiral direction of the second spiral information track when the first disc unit and the second disc unit are not joined; and forming a multilayered structure by joining the first and the second disc units such that the first and second surfaces face each other and such that the first and second spiral directions are the same.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENTS

Figure 3:
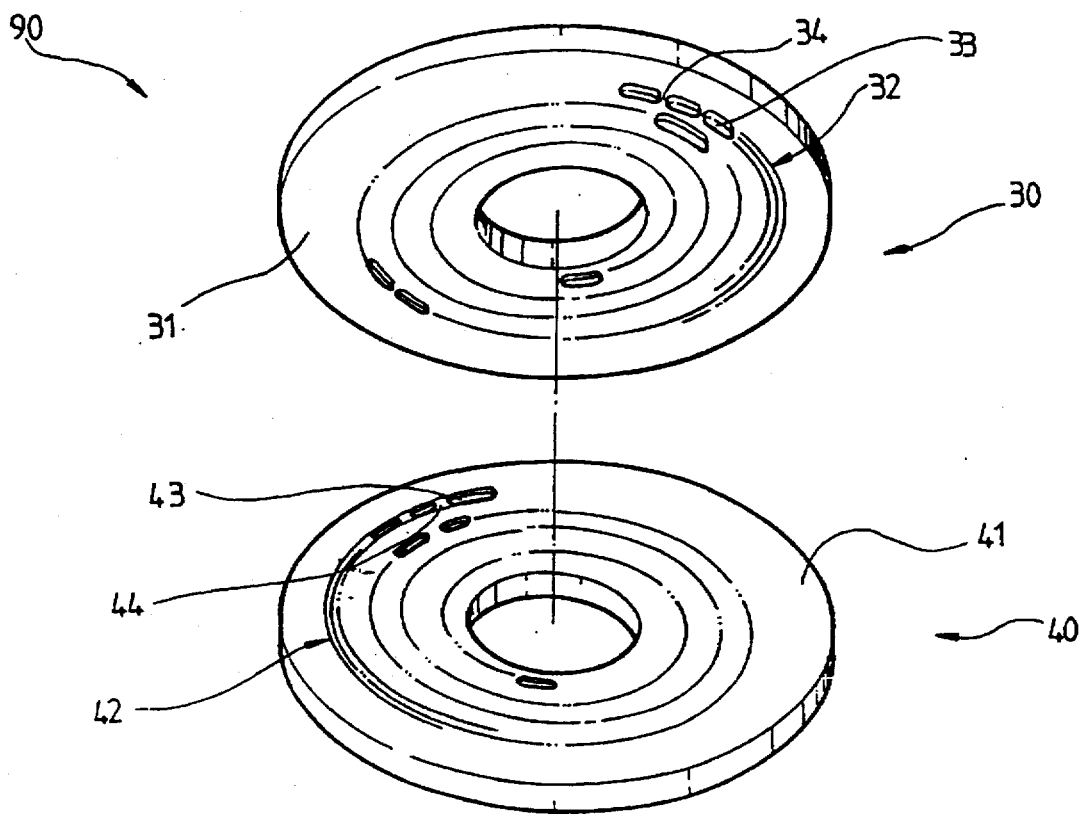
FIG. 3 is a perspective view schematically showing a multilayer information disc according to the present invention in a separated state.
Figure 4:
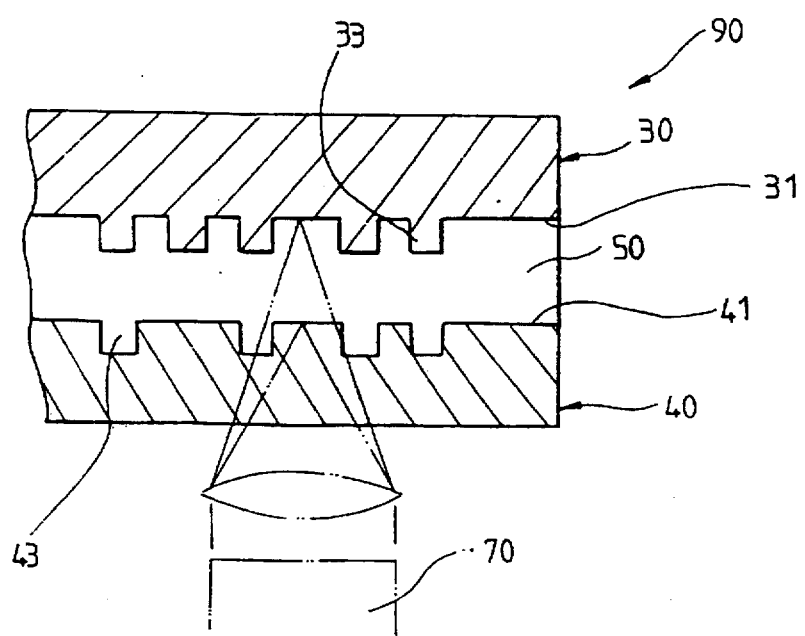
FIG. 4 is a cross-sectional view showing the multilayer information disc of FIG. 3 in a united state.

One embodiment of the multilayer information disc of the present invention is shown in FIGS. 3 and 4. In particular, FIG. 3 is a perspective view schematically showing two separated disc units which form the multilayer information disc, and FIG. 4 is a cross-sectional view of the two disc units joined together.

As shown in the figures, a multilayer information disc 90 is formed by joining an upper disc unit 30 and a lower disc unit 40 via a juncture member 50. Also, each of the disc units 30 and 40 respectively comprise recording surfaces 31 and 41 which contain spiral information tracks 32 and 42 on which information is recorded.

As illustrated in FIG. 3, the spiral direction of the information track 42 of the lower disc unit 40 is counterclockwise as one moves from the edge to the center of the disc unit 40. On the other hand, the spiral direction of the information track 32 of the upper disc unit 30 is clockwise as one moves from the edge to the center of the disc unit 30. As a result of the above configuration, the spiral directions of the information tracks 32 and 42 coincide with each other when the recording surfaces of 31 and 41 of the disc units are joined with and face each other. Consequently, when the multilayer information disc 90 is loaded in a disc player, the information tracks 32 and 42 have the same spiral direction relative to an optical pickup device 70 of the disc player.

The information track 42 of lower disc unit 40 contains a plurality of pits 43 which are formed at a predetermined depth in the recording surface 41. Furthermore, the portions of the recording surface 41 between adjacent pits 43 form prominence sections 44 which resemble projections when compared to the pits 43. By selectively varying the length and the position of the pits 43 and the prominence sections 44, information is stored in the information track 42.

On the other hand, the information track 32 of upper disc unit 30 preferably comprises a plurality of protrusions 33 which are raised a predetermined distance from the recording surface 31. Furthermore, the portions of the recording surface 31 between adjacent protrusions 33 form concave sections 34 which are recessed in comparison to the protrusions 33. Consequently, the information track 32 can store information by selectively varying the length of protrusions 33 and concave sections 34.

As described above, the spiral directions of the information tracks 32 and 42 in the disc units 30 and 40 coincide with each other when the units 30 and 40 are joined together via the juncture member 50 to form the multilayer information disc 90. Accordingly, all of the information recorded on both of the disc units 30 and 40 can be reproduced by rotating the disc 90 in only one direction.

Figure 1:
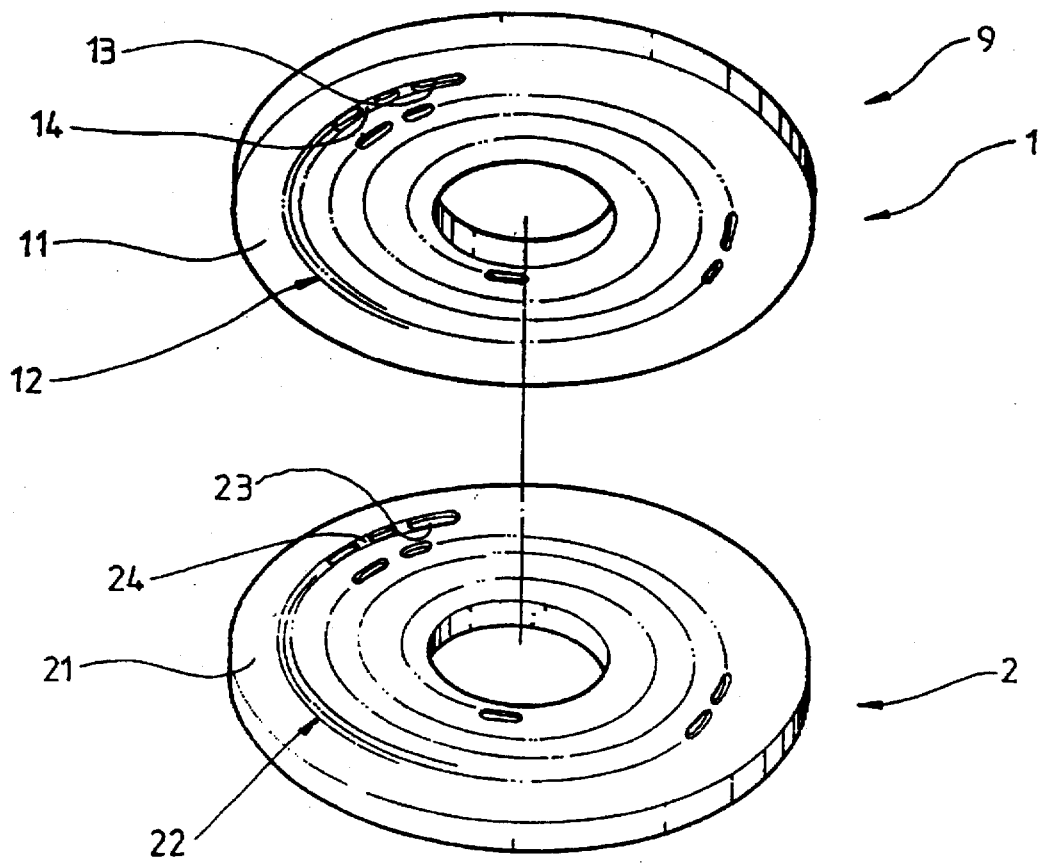
FIG. 1 is a perspective view schematically showing a conventional multilayer information disc in a separated state.
Figure 2:
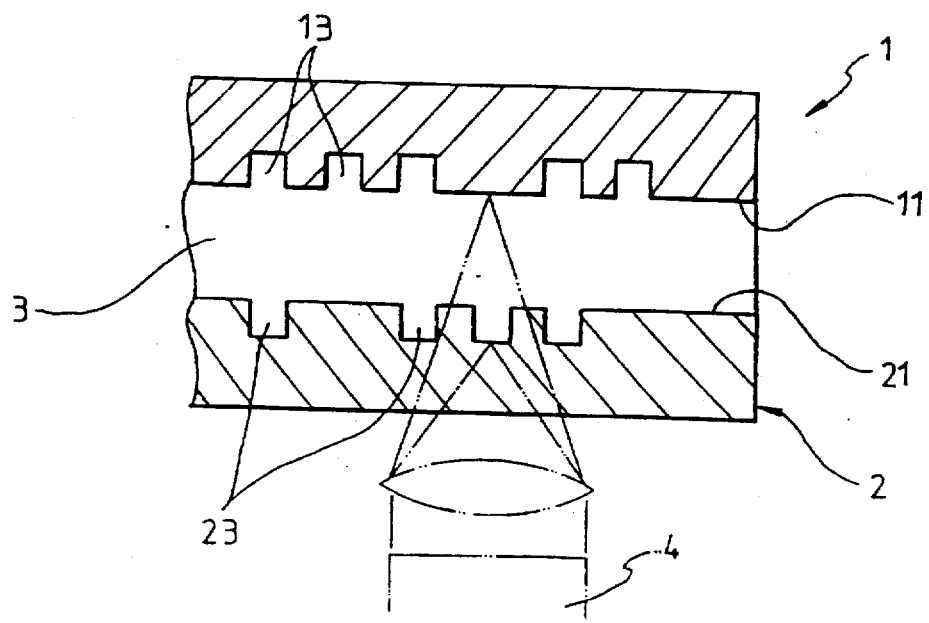
FIG. 2 is a cross-sectional view showing the multilayer information disc of FIG. 1 in a united state.

As described above, in order to reproduce the information from the disc units 1 and 2 of the conventional multilayer information disc 9 shown in FIGS. 1 and 2, the multilayer information disc 9 must be rotated in two directions. However, information can be reproduced from the multilayer information disc 90 of the present embodiment by rotating the disc 9 in only one direction. Accordingly, the configuration of a disc player which reproduces information from the disc 90 of the present embodiment is significantly simpler than that of a disc player which reads information from the conventional disc 9.

Figure 5:
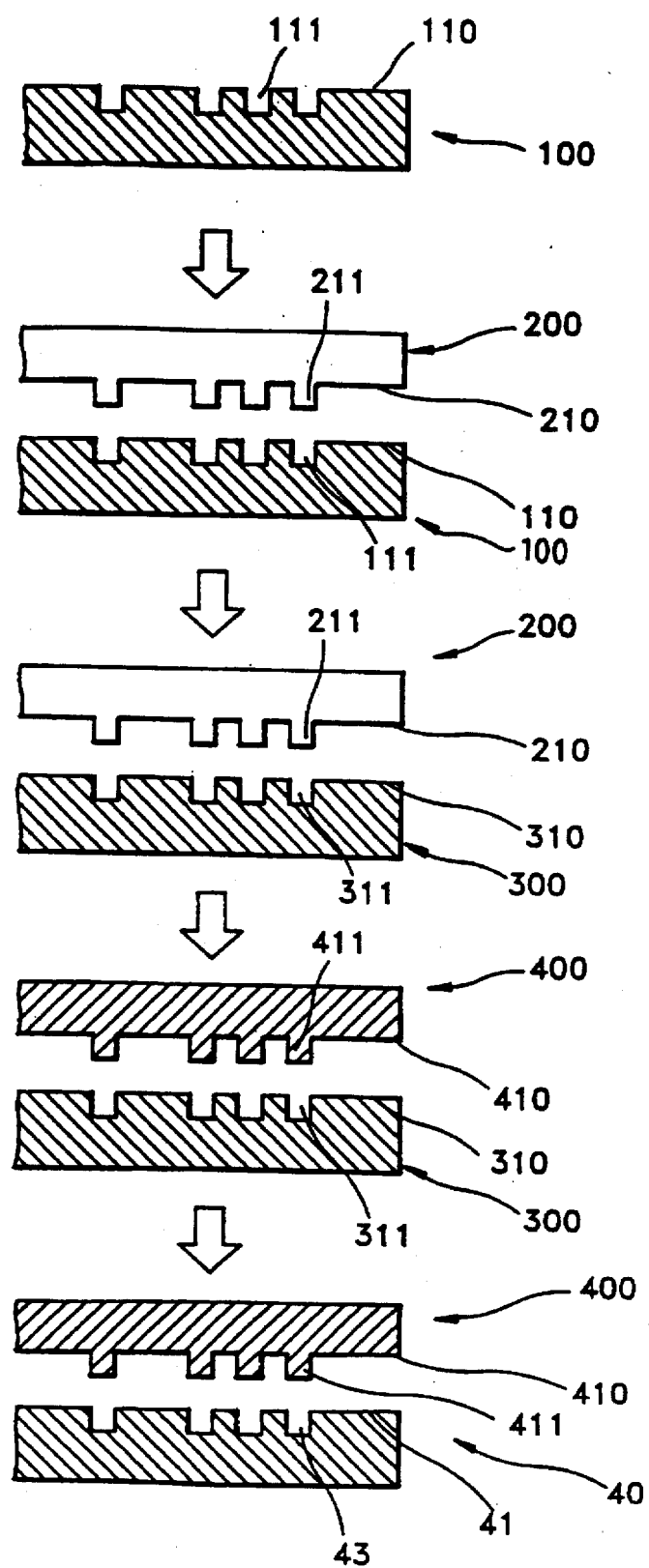
FIG. 5 is a schematic flow chart for explaining the manufacturing process of a disc unit according to the present invention.

One example of a method of manufacturing the disc unit 40 will be described with reference to FIG. 5. As shown in the figure, a single original disc 100 having information to be recorded in the disc unit 40 is manufactured. In particular, the original disc 100 has a spiral information track which comprises a plurality of pits 111 formed at a predetermined depth in the recording surface 110.

Once the original disc 100 is manufactured, a metal mask 200 (i.e. a father stamp) is manufactured such that the recording surface 210 of the manufactured metal mask 200 is complementary to the recording surface 110 of the original disc 100. In particular, the pits 111 formed in the recording surface 110 of the original disc 100 correspond to protrusions 211 contained on the recording surface 210 of the metal mask 200. Furthermore, the spiral direction of the information track of the metal mask 200 is opposite to the spiral direction of the information track of the original disc 100.

After the metal mask 200 is created, it can be used to create the disc unit 40 via an injection-molding or compression-molding process. In particular, when the disc unit 40 is formed by one of the processes above, the recording surface 41 of the disc unit 40 corresponds to the recording surface 110 of the original disc 100. Specifically, the pits 43 and the spiral direction of the information track 42 of the disc unit 40 correspond to the pits 111 and the spiral direction of the information track of the original disc 100.

However, when disc units 40 are manufactured by using only a single metal mask 200, the rate of producing the disc units 40 is relatively low. Furthermore, the single metal mask 200 must be periodically replaced with new metal masks 200 as a result of damage which occurs during the course of manufacturing the discs 40.

Since the cost of manufacturing metal masks 200 is high due to their complexity, a plurality of molding stamps 400, which have the same recording surface as the metal masks 200, may be manufactured to produce the disc units 40. In order to create the molding stamps 400, a plurality of intermediary stamps 300 (i.e. mother stamps) are manufactured from the metal mask 200 by plating the recording surface 210 of metal mask 200. Subsequently, each of the intermediary stamps 300 are used to produce a plurality of molding stamps 400 (i.e. son stamps) via a plating process. As a result, the disc units 40 can be manufactured via an injection-molding process or a compression-molding process using the molding stamps 400.

As indicated by the explanation above, the original disc 100 and the intermediary stamps 300 respectively have the same to recording surfaces 110 and 310, and the metal mask 200 and the molding stamps 400 respectively have the same recording surfaces 210 and 410. However, the recording surfaces 110 and 310 of the original disc 100 and the intermediary stamps 300 are opposite to the recording surfaces 210 and 410 of the metal mask 200 and the molding stamps 400. Accordingly, if the disc unit 40 is produced via an injection-molding process or a compression-molding process using either the metal mask 200 or the molding stamps 400, the recording surface 41 of the disc unit 40 will be the same as the recording surface 110 of the original disc 100.

Figure 6:
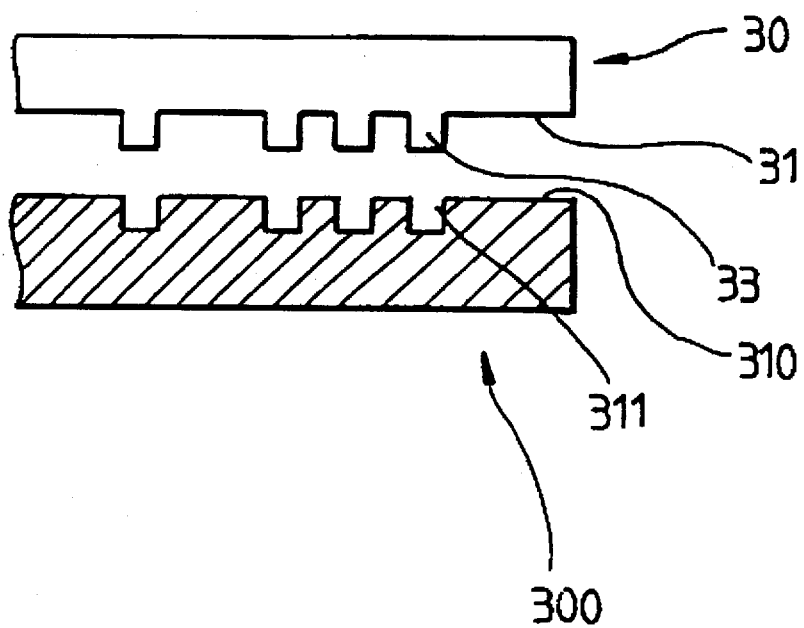
FIG. 6 is a schematic cross-sectional view for explaining the manufacturing method of a disc unit according to another embodiment of the present invention.

As shown in FIG. 6, an intermediary stamp 300 may be used to produce the disc unit 30. Specifically, by using the stamp 300, the disc unit 30 will have a recording surface 31 which is opposite to the recording surface 41 the disc unit 40 manufactured by the molding stamp 400. In other words, the disc unit 30 will have a information track 32 which is opposite to the information track 42 of the disc unit 40 and will have protrusions 33 which protrude from the recording surface 31 instead of pits which recede into the recording surface.

In the present embodiment, the information track 32 of the upper disc unit 30 is provided with protrusions 33 which protrude from the recording surface 31. However, it is not necessary to form such protrusions 33 on the recording surface 31. In particular, the recording surface 31 does not necessarily have to contain protrusions 33 as long as the spiral direction of information track 32 of upper disc unit 30 is the same as the spiral direction of the information track 42 of the lower disc unit 40 when the disc units 30 and 40 are joined together.

Also, in the present embodiment, the multilayer information disc 90 comprises two disc units 30 and 40 which contain recording surfaces 31 and 41 that face each other. However, the present invention is not limited by the specific embodiment, and another disc unit can be formed below the lower disc unit 40 or can be formed above the upper disc unit 30. Also, additional disc units can be further layered upon each of the upper and lower disc units 30 and 40.

As described above, information can be reproduced from multiple disc units of the multilayer information disc of the present invention by rotating the disc in only one direction. Consequently, the configuration of a disc player which reads information from the disc can be simplified.

Furthermore, it is to be understood that the above described embodiments of the invention are only illustrative and that modifications thereof may occur to those skilled in the art. Accordingly, the present invention is not to be regarded as limited to the embodiments disclosed herein, but is to be limited only as defined by the appended claims.

What is claimed is:

1. A manufacturing method of a multilayer information disc, comprising the steps of:

manufacturing an original disc having an original recording surface, wherein said original recording surface comprises an original information track having one of a plurality of pits and a plurality of protrusions and having an original spiral direction;

manufacturing a metal mask based on said original disc, wherein said metal mask comprises a metal mask recording surface having a metal mask information track, and wherein said metal mask recording surface is complementary to said original recording surface such that a metal mask spiral direction of said metal mask information track is opposite to said original spiral direction when said original disc and said metal mask are separate;

manufacturing a first disc unit based on said metal mask, wherein said first disc unit comprises a first recording surface having a first information track, and wherein said first recording surface is substantially identical to said original recording surface such that a first spiral direction of said first information track is the same as said original spiral direction;

manufacturing a second disc unit, wherein said second disc unit comprises a second recording surface having a second information track, and wherein said second information track has a second spiral direction which is the opposite to said first spiral direction when said first and second disc units are separate; and forming a multilayered structure by joining said first and second disc units such that said first and second recording surfaces face each other and such that said first and second spiral directions are the same when said first and second disc units are joined, wherein said second disc unit is manufactured based on said original disc, and wherein said second recording surface is substantially identical to said metal mask recording surface such that said second spiral direction is the same as said metal mask spiral direction.

2. The manufacturing method as recited in claim 1, wherein said second disc unit is manufactured directly from said original disc.

3. A manufacturing method of a multilayer information disc, comprising the steps of:

manufacturing an original disc having an original recording surface, wherein said original recording surface comprises an original information track having one of a plurality of pits and a plurality of protrusions and having an original spiral direction;

manufacturing a metal mask based on said original disc, wherein said metal mask comprises a metal mask recording surface having a metal mask information track, and wherein said metal mask recording surface is complementary to said original recording surface such that a metal mask spiral direction of said metal mask information track is opposite to said original spiral direction when said original disc and said metal mask are separate;

manufacturing a first disc unit based on said metal mask, wherein said first disc unit comprises a first recording surface having a first information track, and wherein said first recording surface is substantially identical to said original recording surface such that a first spiral direction of said first information track is the same as said original spiral direction;

manufacturing a second disc unit, wherein said second disc unit comprises a second recording surface having a second information track, and wherein said second information track has a second spiral direction which is the opposite to said first spiral direction when said first and second disc units are separate; and forming a multilayered structure by joining said first and second disc units such that said first and second recording surfaces face each other and such that said first and second spiral directions are the same when said first and second disc units are joined;

manufacturing an intermediary stamp directly from said metal mask, wherein said intermediary stamp comprises an intermediary recording surface having an intermediary information track, and wherein said intermediary recording surface is substantially identical to said original recording surface such that an intermediary spiral direction of said intermediary information track is the same as said original spiral direction;

manufacturing a molding stamp directly from said intermediary stamp, wherein said molding stamp comprises a molding recording surface having a molding information track, and wherein said molding recording surface is substantially identical to said metal mask recording surface such that a molding spiral direction of said molding information track is the same as said metal mask spiral direction; and manufacturing said first disc unit based on said molding stamp such that said first spiral direction is the same as said original spiral direction, wherein said second disc unit is manufactured based on said intermediary stamp such that said second spiral direction is the same as said metal mask spiral direction.

4. The manufacturing method as recited in claim 3, wherein said second disc unit is manufactured directly from said intermediary stamp.

5. The manufacturing method as recited in claim 4, wherein said first disc unit is manufactured directly from said molding stamp.

* * * * *